(12) United States Patent
Zhang et al.

(10) Patent No.: US 10,730,271 B2
(45) Date of Patent: Aug. 4, 2020

(54) SIZED GLASS FIBERS FOR FIBER-CONTAINING COMPOSITE ARTICLES AND METHODS OF MAKING THEM

(71) Applicant: JOHNS MANVILLE, Denver, CO (US)

(72) Inventors: Mingfu Zhang, Highlands Ranch, CO (US); Jawed Asrar, Englewood, CO (US); Klaus Friedrich Gleich, Nuremberg (DE); Asheber Yohannes, Littleton, CO (US)

(73) Assignee: Johns Manville, Denver, CO (US)

( * ) Notice: Subject to any disclaimer, the term of this patent is extended or adjusted under 35 U.S.C. 154(b) by 85 days.

(21) Appl. No.: 16/059,243

(22) Filed: Aug. 9, 2018

(65) Prior Publication Data

US 2018/0345636 A1    Dec. 6, 2018

Related U.S. Application Data

(62) Division of application No. 13/915,023, filed on Jun. 11, 2013, now Pat. No. 10,265,934.

(51) Int. Cl.
| | |
|---|---|
| *B32B 27/12* | (2006.01) |
| *C08J 5/08* | (2006.01) |
| *C08J 5/24* | (2006.01) |
| *B29B 15/10* | (2006.01) |
| *B29C 65/02* | (2006.01) |
| *B32B 5/02* | (2006.01) |
| *B32B 27/34* | (2006.01) |

(Continued)

(52) U.S. Cl.
CPC ............ *B32B 27/12* (2013.01); *B29B 15/105* (2013.01); *B29C 65/02* (2013.01); *B32B 5/024* (2013.01); *B32B 27/34* (2013.01); *C03C 25/32* (2013.01); *C03C 25/328* (2013.01); *C08J 5/08* (2013.01); *C08J 5/24* (2013.01); *C08K 5/5442* (2013.01); *C08K 5/5455* (2013.01); *C08K 7/14* (2013.01); *F01D 5/282* (2013.01); *F03D 1/0675* (2013.01); *B32B 2262/101* (2013.01); *B32B 2439/00* (2013.01); *B32B 2509/00* (2013.01); *B32B 2603/00* (2013.01); *B32B 2605/08* (2013.01); *B32B 2605/18* (2013.01); *C08J 2377/02* (2013.01); *C08J 2377/06* (2013.01); *F05D 2220/30* (2013.01); *F05D 2230/30* (2013.01); *F05D 2300/43* (2013.01); *F05D 2300/6012* (2013.01); *F05D 2300/611* (2013.01); *Y02E 10/721* (2013.01)

(58) Field of Classification Search
CPC ....................................................... B32B 27/12
See application file for complete search history.

(56) References Cited

U.S. PATENT DOCUMENTS

| | | | | |
|---|---|---|---|---|
| 2004/0028884 A1* | 2/2004 | Woolstencroft | ........ | B29C 70/08 428/292.1 |
| 2010/0286343 A1* | 11/2010 | Burghardt | ............ | C08G 18/718 525/410 |

* cited by examiner

*Primary Examiner* — Daniel H Lee
(74) *Attorney, Agent, or Firm* — Robert D. Touslee

(57) ABSTRACT

Methods of making prepregs are described. The methods include the steps of forming a fiber-containing substrate, and contacting the fiber-containing substrate with a resin mixture. The resin mixture may include polymer particles mixed in a liquid medium, and the polymer particles may be coated on the fiber-containing substrate to form a coated substrate. The liquid medium may be removed from the coated substrate to form the prepreg. The prepregs may be used to make fiber-reinforced articles.

20 Claims, 5 Drawing Sheets

(51) Int. Cl.
*C03C 25/32* (2018.01)
*C03C 25/328* (2018.01)
*C08K 5/544* (2006.01)
*C08K 5/5455* (2006.01)
*C08K 7/14* (2006.01)
*F01D 5/28* (2006.01)
*F03D 1/06* (2006.01)

SIZED GLASS FIBERS FOR FIBER-CONTAINING COMPOSITE ARTICLES AND METHODS OF MAKING THEM

CROSS REFERENCE TO RELATED APPLICATIONS

This application is a division of pending U.S. application Ser. No. 13/915,023 filed Jun. 11, 2013, the entire disclosure of which is hereby incorporated by reference herein.

BACKGROUND

Thermoset plastics are favored for making many kinds of fiber-reinforced articles because of their ease of manufacture. Uncured thermosets are often low viscosity liquids at room temperature and easily wet a fabric of fibers. Once they have migrated through the fabric and surrounded its fibers, a curing stage (sometimes called a hardening stage) commences to polymerize the thermoset into a polymer matrix. Often, this wetting and curing takes place in a mold that defines the shape of the fiber-reinforced article.

The uncured thermoset resins used to make the composite are generally inexpensive, but often off-gas irritating and sometimes dangerous volatile organic compounds (VOCs). The outgassing of VOCs are of particular concern during curing, when the exothermic nature of many thermoset polymerization reactions raise the temperature of the composite and drive more VOCs into the gas phase. In many instances, it is necessary to cure large thermoset articles in facilities equipped with robust ventilation and air scrubbing equipment, increasing the overall production costs.

Thermoset articles are also difficult to repair or recycle. Hardened thermoset binders often have a high degree of crosslinking, making them prone to fractures and breaks. Because thermosets normally will not soften or melt under heat, they have to be replaced instead of repaired by welding. Compounding difficulties, the unrepairable thermoset part normally cannot be recycled into new articles, but must instead be landfilled at significant cost and adverse impact on the environment. The problems are particularly acute when large thermoset parts, such as automotive panels and wind turbine blades, need to be replaced.

Because of these and other difficulties, thermoplastic resin systems are being developed for fiber-reinforced articles that were once exclusively made using thermosets. Thermoplastics typically have higher fracture toughness and chemical resistance than thermosets. They also soften and melt at raised temperatures, allowing operators to heal cracks and weld together pieces instead of having to replace a damaged part. Perhaps most significantly, discarded thermoplastic parts can be broken down and recycled into new articles, reducing landfill costs and stress on the environment.

Unfortunately, many thermoplastics also have production challenges, including high flow viscosities that cause difficulties loading and wetting the thermoplastic resin into the fibers. In some instances the melted thermoplastic is raised to high temperature, pulled into the fibers under high pressure, and if necessary under high vacuum, to increase the infiltration rate. At a minimum, these techniques increase the complexity and cost of producing the fiber-reinforced article and often result in a thermoplastic matrix that is poorly bonded to the reinforcing fibers. Thus, there is a need to develop new thermoplastic resin formulations and new ways to combine thermoplastic resins with reinforcing fibers. These and other issues are addressed in the present application.

BRIEF SUMMARY

Methods of making and using prepregs in the construction of fiber-containing composite articles are described. The present prepregs include the combination of thermoplastic polymers and sized glass-fiber substrates. The thermoplastic polymers may be combined with the sized glass-fiber substrates as polymer films and/or polymer particles. When the thermoplastic polymers are combined as polymer particles, they may be delivered to the sized glass-fiber substrate as a mixture of the polymer particles in a liquid medium. The polymer particles may be made from a polyamide polymer (e.g., nylon-6, nylon-6,6, etc.), either exclusively or in combination with other thermoplastic polymers. In some embodiments, the thermoplastic polymer may also be blended with pre-polymerized monomers and/or oligomers, such as cyclic alkylene terephthalate monomers and oligomers.

The sized glass-fiber substrate may be formed by contacting glass fibers with a sizing composition that includes a blocked isocyanate coupling compound. These coupling compounds include a moiety that covalently bonds the compound to a surface on the glass fiber (e.g., a silicon-containing moiety), and also include a blocked isocyanate group. The blocked isocyanate group may be represented by the formula:

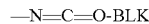

where the "BLK" moiety represents a blocking group that can be reversibly bonded to the oxygen atom of the isocyanate group. The glass fibers sized with the blocked isocyanate coupling compound may then be assembled into a sized glass-fiber substrate. For example, the sized glass fibers may be assembled into a woven glass fabric.

When polymer particles are used, they may be coarse enough to remain close to the fabric surface, or fine enough to penetrate through the exposed surface of the sized glass-fiber substrate. In some embodiments, both coarse and fine grained polymer particles may be added to the substrate, creating adjustable concentrations of the thermoplastic polymer between the exposed surface of the substrate and the underlying bulk.

The combination of the sized glass-fiber substrate and the polymer particles may undergo further treatment to form the prepreg. Treatment steps may include removing the liquid medium, for example by evaporation. They may also include heating the combination of substrate and resin particles, and in some instances melting them.

In some instances, the polymer particles embedded in the sized glass-fiber substrate may be joined by one or more layers of thermoplastic resin laid over the coated substrate. The thermoplastic layers increase the plastic content of the prepreg using economically made layers (e.g., sheets, films) of the same or different thermoplastic polymer. Embodiments may also include stacked prepregs made from alternating layers of the sized glass-fiber substrate and films of thermoplastic polymer.

The prepregs may be used to make thermoplastic fiber-containing composite articles such as automotive parts, airplane parts, and turbine blades, among other articles. Because the thermoplastic polymer is already present in the prepregs, less or no additional polymer resins have to be injected into fiber-containing substrate. This can help mitigate a common problem thermoplastic resins have infiltrating and wetting substrate fibers.

Exemplary methods of making the fiber-containing composite articles may include forming the prepregs into the shape of the article, and heating them to unblock the blocked isocyanate groups on the coupling compound. The on blocked isocyanate groups can form covalent bonds with certain moieties in the thermoplastic polymer (e.g., amine groups on polyamide polymers). This allows the coupling compound to bond with both the surface of the glass fibers and the thermoplastic polymer, strengthening the fiber-containing composite.

Embodiments of the invention include methods of making a prepregs. The methods include the step of forming a sized glass-fiber substrate. This sized glass-fiber substrate may be formed by contacting glass fibers with a sizing composition that includes a blocked isocyanate coupling compound to make sized glass fibers, and assembling the sized glass fibers into the sized glass-fiber substrate. The methods may also include the step of contacting the sized glass-fiber substrate with a solid thermoplastic polymer comprising a polymer film or polymer particles.

Embodiments of the invention further include methods of making a fiber-containing composites. The methods may include the step of forming one or more prepreg layers from the combination of a sized glass-fiber substrate and a thermoplastic polymer. The sized glass-fiber substrate may formed by contacting glass fibers with a sizing composition that includes a blocked isocyanate coupling compound to make sized glass fibers, and assembling the sized glass fibers into the sized glass-fiber substrate. The thermoplastic polymer may be chosen from at least one of (i) a thermoplastic polymer film, and (ii) thermoplastic particles. The methods may also include heating the one or more prepreg layers to a temperature that unblocks the blocked isocyanate coupling compound to create an activated isocyanate moiety on the compound. The activated isocyanate moiety reacts with the thermoplastic polymer to form the fiber-containing composite.

Embodiments of the invention still further include prepregs made according to the present methods. The prepregs may include a sized glass-fiber substrate, where the substrate includes a blocked isocyanate coupling compound coupled to the glass fibers.

The prepregs may further include a solid thermoplastic polymer, where the solid thermoplastic polymer can be a polymer film, polymer particles, or a combination of polymer film and polymer particles.

Embodiments of the invention yet further include fiber-containing composites having at least one sized glass-fiber substrate and at least one thermoplastic polymer coupled to the sized glass-fiber substrate. The fiber-containing composite is derived from a prepreg that is formed by contacting glass fibers with a sizing composition that includes a blocked isocyanate coupling compound to make sized glass fibers, assembling the sized glass fibers into the sized glass-fiber substrate, and contacting the sized glass-fiber substrate with the thermoplastic polymer. The thermoplastic polymer may include at least one of (i) a thermoplastic polymer film, and (ii) thermoplastic particles.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION

Figure 1:
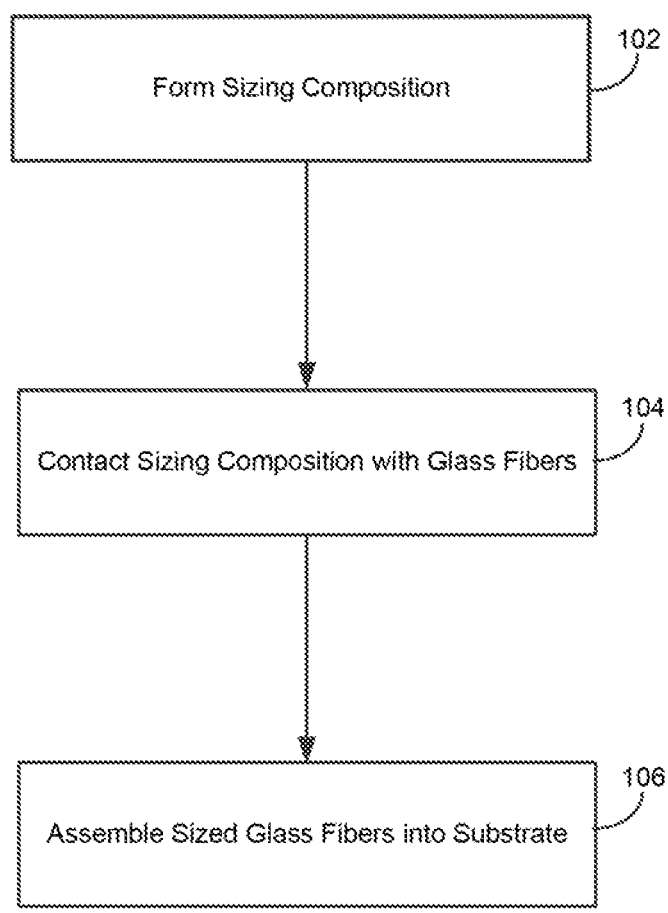
FIG. 1 is a flowchart showing selected steps in a method of making a sized glass-fiber substrate according to embodiments of the invention.

Methods are described for making exemplary sized glass-fiber substrates that may be used to make exemplary prepregs, which in turn may be used to make exemplary fiber-containing composites. Also described are exemplary sized glass-fiber substrates, prepregs, and fiber-composites composites themselves. The sized glass-fiber substrates include a coupling compound having a glass coupling moiety that bonds the compound to an exposed surface of the glass fiber and a polymer coupling moiety that bonds the compound to the thermoplastic polymer in proximity to the glass fiber. The prepregs may include combinations of the sized glass-fiber substrate with one or more thermoplastic polymers in the form of polymer films and/or polymer particles. The prepregs may be shaped and arranged in a template, mold, etc., and treated to form the fiber-containing composites. Exemplary fiber-containing composites may include turbine blades for windmills, wings for aircraft, and a variety of other types of fiber-reinforced composite parts.
Exemplary Methods of Making Sized Glass-Fiber Substrates FIG. 1 shows selected steps in a method 100 of making a sized glass-fiber substrate that can be used to form a prepreg. The method 100 includes the step of forming the sizing composition 102. Suitable sizing compositions may be prepared by adding the coupling compound to water or another suitable solvent to form a solution. The sizing composition may also include other sizing composition components known in the art, such as film-forming polymers, lubricants, defoamers, biocides, other silanes, etc. The concentration of the coupling compound in the sizing composition may be set to achieve a target concentration of bonded coupling compound on the glass fibers. The overall concentration of the coupling compound and other components in the sizing composition can be adjusted over a wide range according to the means of application to be used, the composition of the glass to be sized, and the intended use of the sized glass-containing fibers. In one embodiment, the sizing composition may contain about 1-5 wt % of the coupling compound (e.g., about 5 wt. %). The components of the sizing composition may be added sequentially, or they may be pre-diluted before they are combined.

Exemplary coupling compounds may include a silicon-containing coupling moiety that bonds to the glass fibers and a blocked isocyanate moiety that bonds to the thermoplastic polymer. The silicon-containing coupling moiety may be represented by:

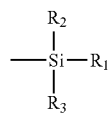

Where $R_1$, $R_2$, and $R_3$ may be the same or different, and each may represent an alkyl, aryl, alkoxy, halogen, hydroxyl, or cyclic structure. Exemplary silicon-containing coupling moieties may include trialkoxysilane groups such as —Si(OMe)$_3$, —Si(OEt)$_3$, etc.

Exemplary blocked isocyanate moieties include an isocyanate group (—N═C═O) where the oxygen is reversibly bonded to a blocking group. The blocked isocyanate group may be obtained by reacting the free isocyanate group with a compound that renders it unreactive. A suitable blocking agent for the isocyanate group may be determined by its ability to prevent the blocked isocyanate from reacting until a desired temperature is achieved. Examples of compounds that may be suitable blocking agents include, but are not limited to, oximes such as methyl ethyl ketoxime, acetone oxime, and cyclohexanone oxime, lactams such as ε-caprolactam, and pyrazoles. Organosilicon compounds with a blocked isocyanate group are known in the art, e.g. see U.S. Patent Publication 2007/0123644, incorporated herein by reference. Upon heating or other deblocking conditions, these blocked isocyanates decompose to free isocyanate and the blocking species. Deblocking temperatures depend on the blocking groups and typically are in the range 70° C. to 200° C. When the sized glass fibers with are exposed to unblocking conditions (e.g., elevated temperatures) the isocyanate group may become unblocked to form the active isocyanate compound chemically bonded to the glass surface. Now unblocked, the isocyanate group is available to react with the adjacent thermoplastic polymer, coupling the polymer and glass fiber through the coupling compound.

Exemplary coupling compounds may include blocked isocyanate coupling compounds having a silicon-containing moiety and a blocked isocyanate moiety. These blocked isocyanate coupling compounds may include carboxamide compounds, carbamate compounds, and isocyanurate compounds, among others. Specific examples of carboxamide compounds include 2-oxo-N-(3-(triethoxysilyl)propyl) azepane-1-carboxamide. Specific examples of carbamate compounds include triethoxysilylpropylethyl carbamate and (3-triethoxysilylpropyl)-t-butyl carbamate. Specific examples of isocyanurate compounds include tris(3-trimethoxysilylpropyl) isocyanurate. Additional details about these and other exemplary compounds, as well as methods of making them, can be found in co-assigned U.S. Pat. No. 8,293,322, entitled "SURFACES CONTAINING COUPLING ACTIVATOR COMPOUNDS AND REIN-FORCED RESINS PRODUCED THEREFROM", the entire contents of which are herein incorporated by reference for all purposes.

After the sizing composition has been formed, it may be contacted with the glass fibers 104. The glass fibers may include those prepared from glass compositions such as "E-glass", "A-glass", "C-glass", "S-glass", "ECR-glass" (corrosion resistant glass), "T-glass", and fluorine and/or boron-free derivatives thereof. Typical formulations of glass fibers are disclosed in K. Lowenstein, The Manufacturing Technology of Continuous Glass Fibers (Third Ed. 1993), incorporated herein by reference.

The sizing composition may be applied to the glass fibers by suitable methods known to one of skill in the art. For example, the sizing composition may be applied to glass fibers pulled from a bushing using a kiss-roll applicator. Other ways of applying the sizing composition may include contacting glass fibers with other static or dynamic applicators, such as a belt applicator, spraying, dipping, or any other means.

After the fibers have been coated with the sizing composition, they can be assembled into the glass-fiber containing substrate 106. Exemplary sized substrates may include a woven glass-fiber fabric, multiaxial glass fabrics, stitched glass fabrics, and in some instances, nonwoven glass fabrics. In addition to the glass fibers, the fabrics may include one or more of basalt fibers, carbon fibers, polymer fibers (e.g., aramide fibers), and natural fibers (e.g., cellulose fibers), among other types of fibers.

Alternatively, the sized glass fibers may be collected in rovings or may be chopped to form chopped strands. Rovings of continuous sized strands may be used in some applications, such as long-fiber thermoplastics, or the rovings may be commingled and may be later chopped to a desired length. If the size fibers are being added to a melt of thermoplastic polymers (e.g., polyamide polymers), then the length and diameter of the chopped glass fibers may be determined by various factors such as, but not limited to, the ease of handling when glass fibers are melt-kneaded with the polyamide polymer, the reinforcing effect of the glass fibers, the glass fiber dispersing ability, the type of polyamide resin in which the chopped glass fiber will be used to reinforce, and the intended use of a glass-containing composite. In some embodiments, the length of the chopped glass fiber strand may have a lower limit of 1 mm and an upper limit of length of 50 mm. In one embodiment suitable for reinforcement of nylon-6, the length of the strand may be about 6 mm. After the fiber strands have been chopped, they may then be dried until the moisture level of the fibers is sufficiently low (e.g. below 0.1%).

The sized glass-fiber substrates may be used to form prepregs that are the starting materials of fiber-containing composites. The present prepregs are glass fiber containing materials that have been pre-impregnated with thermoplastic polymers that contribute to the formation of a resin matrix in fiber-containing composites made with the prepregs. When the prepregs are formed exclusively from thermoplastic polymers that do not undergo further polymerization, they are typically referred to as "C-stage" prepreg. Alternatively, if the prepreg contains a significant portion of uncured monomer and/or oligomer that has undergone some polymerization, but is not completely polymerized, it may be referred to as "B-stage" prepreg.

Exemplary Methods of Making Prepregs

Figure 2:
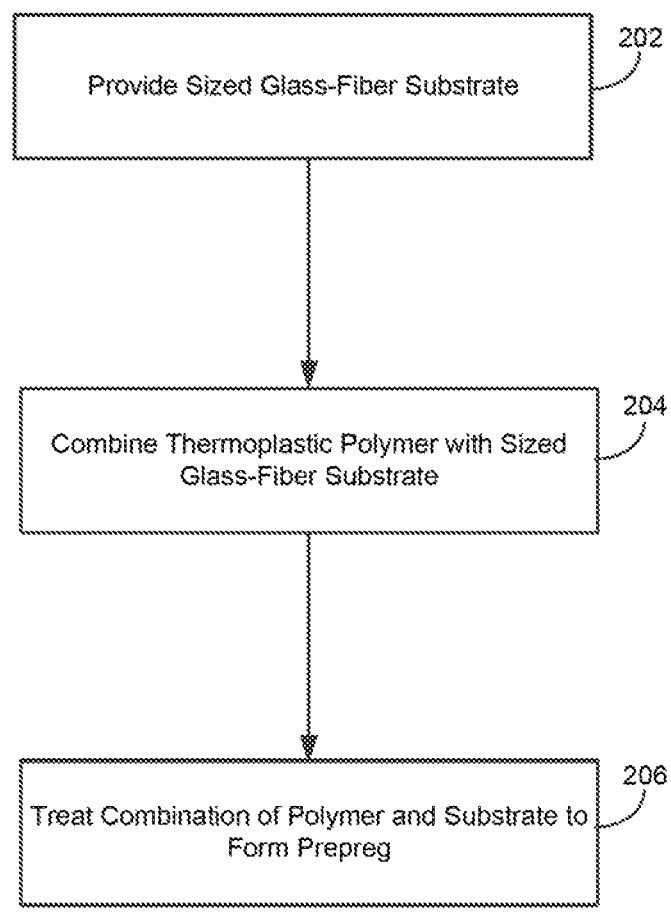
FIG. 2 is a flowchart showing selected steps in a method of making a prepreg according to embodiments of the invention.

FIG. 2 is a flowchart showing selected steps in a method 200 of making such a prepreg. The method 200 may include the step of providing a sized glass-fiber substrate 202 that is used to make the prepreg. Exemplary sized glass-fiber substrates may include woven fabrics, multiaxial fabrics, stitched fabrics, and non-woven fabrics, among others. The sized glass-fiber substrates may be made according to the method 100 described above.

The method 200 may also include combining the sized glass-fiber substrate with a thermoplastic polymer 204. The thermoplastic polymer may include one or more polymers that can form covalent bonds with the unblocked isocyanate moiety on the sized glass fibers of the substrate. For example, polyamide polymers (e.g., nylon polymers) have an amine moiety capable of forming a covalent bond with the activated oxygen of the unblocked isocyanate moiety. Specific examples of these polyamide polymers may include nylon 6; nylon-6,6; nylon-6,12; nylon-4,6; nylon-6,10; nylon 12, polyamide 6T (polyhexamethylene terephthalamide); and polyamide 61 (polyhexamethylene isophthalamide), among other polyamide polymers. The thermoplastic polymer may also include combinations of two or more different polymers, such as two or more different polyamide polymers. In addition to the polyamide polymers, exemplary thermoplastic polymers may include polybutylene terephthalate (PBT) polymers, acrylic polymers, polyethylene polymers, polypropylene polymers, polystyrene polymers, and polyvinyl chloride polymers, among other kinds of thermoplastic polymers.

The thermoplastic polymer may be combined with the sized glass-fiber substrate as a polymer particles, polymer film, or a blend of both. When the thermoplastic polymer is combined as polymer particles, the particles may be added as dry solid particles to the sized glass-fiber substrate, or added by a resin mixture. The polymer particles may be incorporated into the liquid medium of the resin mixture through a variety of techniques, including dispersing solid particles of the polymer into the liquid medium. When the thermoplastic polymer is solid at room temperature, it may be ground, milled, or otherwise formed into dispersible particles that are added to the liquid medium. For example, commercial sources of thermoplastic resins are commonly sold as pellets that can be ground into fine particles with average particle diameters of about 1 μm to about 50 μm. The fine particles may then be dispersed into an aqueous medium to form the resin mixture. Additional details about making a resin mixture from a thermoplastic polymer can be found in co-assigned U.S. patent application filed on the same day as the present application, entitled "FIBER-REINFORCED COMPOSITE ARTICLES AND METHODS OF MAKING THEM", by M. Zhang et al, the entire contents of which are herein incorporated by reference for all purposes. Techniques for contacting the sized glass-fiber substrate with the resin mixture may include applying the resin mixture to the substrate by spraying, curtain coating, spin coating, blade coating, dip coating, and/or roll coating, among other techniques.

In additional examples, the polymer particles may be added to the glass-fiber substrate as dry solid particles. For example, the polymer particles may be added by powder spraying them onto the glass-fiber substrate. Additives may be incorporated into the polymer resin, or separately sprayed onto the glass-fiber substrate. Another example would be to contact the glass-fiber substrate (e.g., a preheated or pre-sprayed sized glass-fiber woven fabric) in a fluidized bed of the thermoplastic polymer that would coat/wet the substrate in the fluidized bed.

Once the thermoplastic polymer has been combined with the sized glass-fiber substrate, the combination may be treated to form the prepreg 206. If the thermoplastic polymer includes polymer particles in a resin mixture, treatment steps may include removing some or all of the liquid medium from the resin mixture and/or melting and bonding the polymer particles to the sized glass fibers. For example, the sized glass-fiber substrate soaked in the resin mixture may be heated under conditions conducive to evaporating the liquid medium and leaving a coating of the polymer particles on the fiber substrate. In some instances, the heating temperature may be set high enough to evaporate the liquid medium, unblock the blocked isocyanate moieties, and melt the resin particles. For example, if the resin mixture is an aqueous mixture of nylon particles, the heating temperature may be set somewhere in the range of about 220-270° C., which is high enough to evaporate off substantially all the liquid water, unblock the isocyanate moieties, and melt the nylon particles on the substrate to form a prepreg of thermoplastic resin coating and bonded to the sized glass fibers of the substrate.

In some embodiments, pre-polymerized monomers and/or oligomers may also be present in the resin mixture, and the heating step may start polymerizing these compounds to a B-stage. Other polymerization techniques may be used in addition to (or in lieu of) heating such as exposing the pre-polymerized monomers and/or oligomers to ultraviolet light.

The method 200 may also include optional steps (not shown) of introducing additional compounds to the combination of sized glass-fiber substrate and thermoplastic polymer. For example, it may be desirable to introduce dry resin particles directly on the substrate before and/or after the substrate is contacted by the resin mixture. These dry resin particles may be the same or different from the resin particles in the resin mixture. For example, dry resin particles of additional thermoplastic polymers and/or pre-polymerized monomers and/or oligomers may be sprinkled onto the substrate before, during or after a resin mixture of thermoplastic particles contact the substrate.

When the thermoplastic polymers are supplied in a resin mixture, the liquid medium of the resin mixture may include additional compounds such as thickeners, dispersants, colorants, surfactants, flame retardants, ultraviolet stabilizers, and fillers including inorganic particles and carbon nanotubes, among other additional compounds. If the resin particles include pre-polymerized monomers and/or oligomers, the liquid medium may further include polymerization catalysts and/or polymerization promoters. The polymerization catalyst may include a salt and/or acid that can be partially or fully dissolved, or dispersed, in the liquid medium. When the resin particles are monomers or oligomers of a cyclic alkylene terephthalate, the polymerization catalyst is selected to drive the polymerization of these types of macrocyclic oligoesters. Exemplary polymerization catalysts may include organometallic compounds such as organo-tin compounds and/or organo-titanate compounds. One specific polymerization catalyst for the CBT monomers and oligomers that may be butyltin chloride dihydroxide.

Exemplary Prepregs

Figure 3A:
FIG. 3A shows a sheet of woven polymer layers made by the present methods.
Figure 3B:
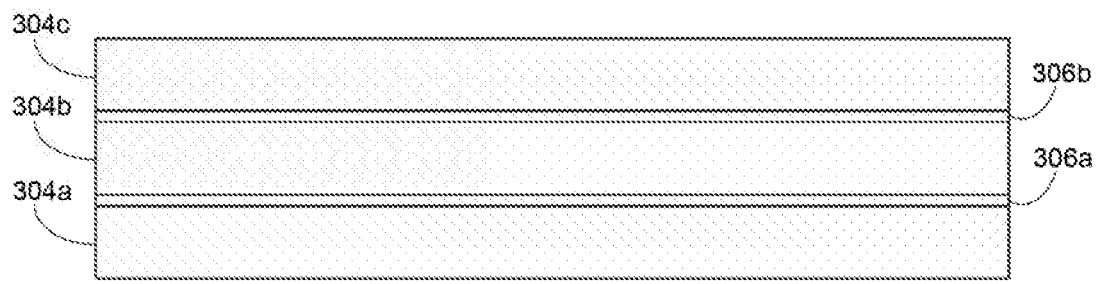
FIG. 3B shows a prepreg stack of alternating layers of coated, sized glass-fiber substrate and thermoplastic layers made by the present methods.
Figure 3C:
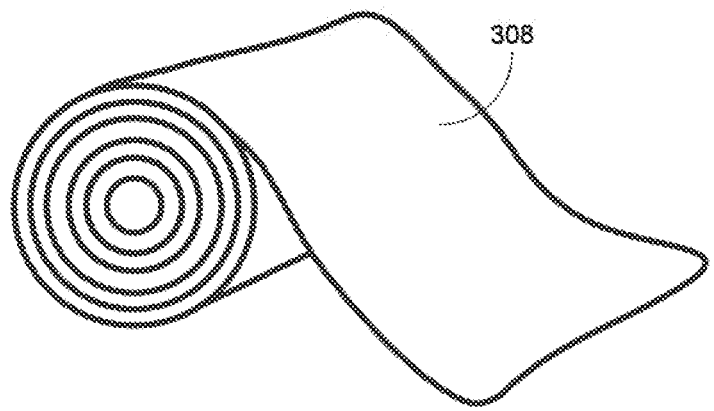
FIG. 3C shows a roll of prepreg material made by the present methods.

FIGS. 3A-C show some exemplary prepregs made using the present methods. FIG. 3A shows a sheet 302 of woven sized glass fabric and polymer particles. The sheet 302 may be heated to the melting temperature of the polymer particles, permitting them to wet the fibers of the woven fabric, bond with the coupling compound on the sized glass fibers, and produce a prepreg sheet having a continuous resin phase.

FIG. 3B shows a prepreg stack of alternating layers of coated, sized glass-fiber substrate 304a-c and thermoplastic polymer layers 306a-b. The embodiment shown has the thermoplastic polymer layers 306a-b sandwiched between the coated fiber substrates 304 a-c. Also contemplated are prepreg stacks where the coated fiber substrates are sandwiched between layers of thermoplastic polymer. The coated fiber substrates 304a-c and/or the thermoplastic polymer layers 306a-b may be sufficiently sticky to hold the prepreg stack together without the application of adhesive. Alternatively, an adhesive may be applied to one or more surfaces of one or more of the layers so they adhere together. In additional embodiments, the coated fiber substrates 304a-c and the thermoplastic polymer layers 306a-b may be bonded together by compressing and/or heating the stack. Similar to the single prepreg layer 302 shown in FIG. 3A, the heating of the stack may cause the thermoplastic polymer layers to bond to the coupling compound on the sized glass fibers of the substrate.

FIG. 3C shows a roll 308 of prepreg material that may be used as sheet molding compound (SMC), among other applications. In some embodiments, the prepreg material may be sandwiched between film layers that prevent contamination of the prepreg as well as the bonding of adjacent layers on the roll. The film layers are selected to easily peel away from the prepreg when it is ready to be used in making fiber-reinforced articles. Alternatively, the film layers may be compatible with the prepreg, and incorporated in the composite part after molding.

Exemplary Methods of Making Fiber-Reinforced Composite Articles

Figure 4:
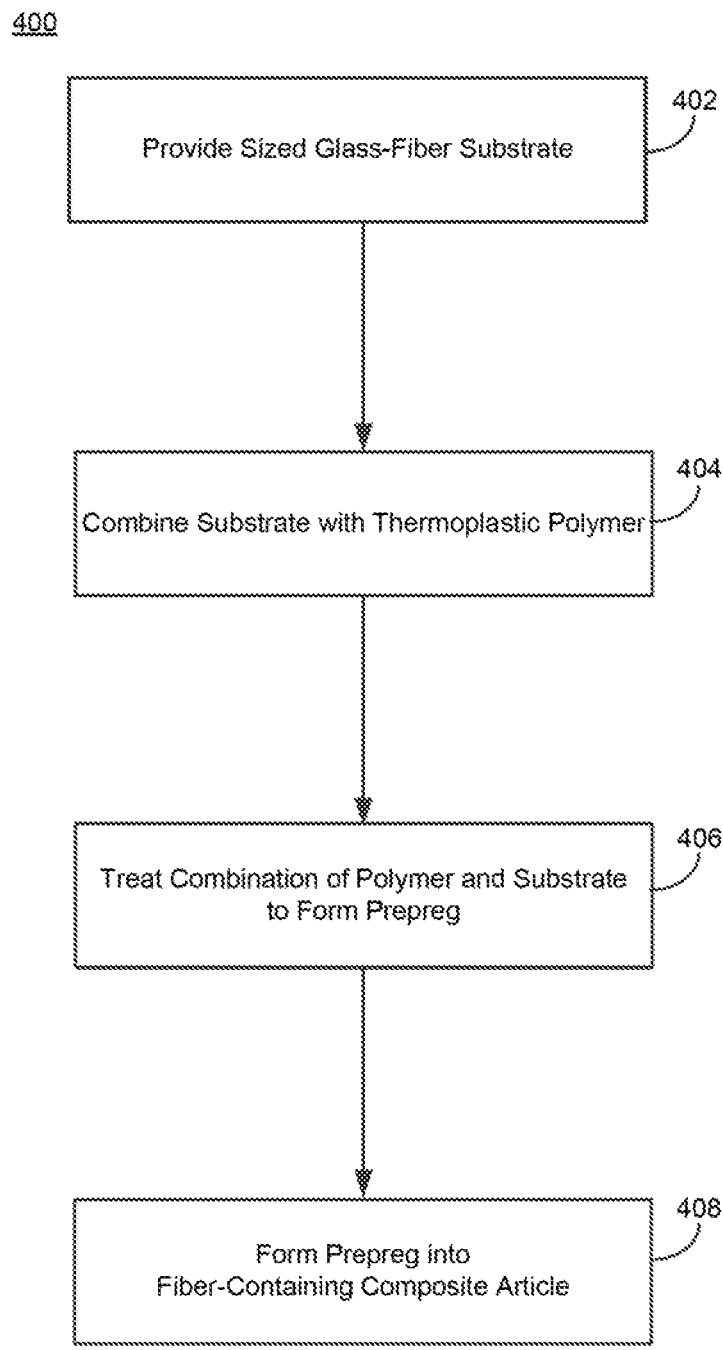
FIG. 4 is a flowchart showing selected steps in a method of making a fiber-reinforced article according to embodiments of the invention.

The prepregs may be used in methods of making a fiber-reinforced article like the method 400 illustrated in FIG. 4. The method 400 includes the step of providing a sized glass-fiber substrate 402. As noted above, exemplary sized glass-fiber substrates may include woven fabrics, multiaxial fabrics, stitched fabrics, and non-woven fabrics, among others. The substrate may be combined with a thermoplastic polymer 404. The combined thermoplastic polymer and substrate may then be treated to form the prepreg 406, similar to the above-described methods 200 of forming a prepreg.

The resulting prepreg may be formed into a fiber-containing composite article 408 through a variety of techniques. For example, a single layer or multiple layers of the prepreg may be compression molded into the fiber-containing article. When the prepreg includes pre-polymerized and/or partially-polymerized resin, the compression molding process may include a heating step (e.g., hot pressing) to fully polymerize the resin. Heat may also be used in the compression molding of fully-polymerized prepregs to melt and mold the prepreg into the shape of the final article.

The prepregs may also be used to in conjunction with other fibers and resin materials to make the final composite article. For example, the prepreg may be placed in selected sections of a tool or mold to reinforce the article and/or provide material in places that are difficult to reach for thermoset and/or thermoplastic resins. For example, the prepregs may be applied to sharp corners and other highly structured areas of a mold or layup used in reactive injection molding processes (RIM), structural reactive injective molding processes (SRIM), resin transfer molding processes (RTM), vacuum-assisted resin transfer molding processes (VTRM), spray-up forming processes, filament winding processes, long-fiber injection molding processes, and pultrusion, among others.

As noted above, the prepregs may include resin particles made from both thermoplastic polymers and pre-polymerized resins. Exemplary pre-polymerized resins may include partially-polymerized CBT monomers and/or oligomers that can be converted to a fully-polymerized fiber-reinforced article under isothermal processing conditions. For example, the prepreg may include resin particles made from a blend of polyamide polymers (e.g., nylon-6, nylon-6,6) and pre-polymerized CBT monomers and/or oligomers. The polyamide polymers may come from recycled and/or less expensive sources than the CBT, so substitution of a significant portion of the CBT with the polyamide can reduce the overall production costs of the prepreg.

Exemplary Fiber-Reinforced Composite Articles

Figure 5:
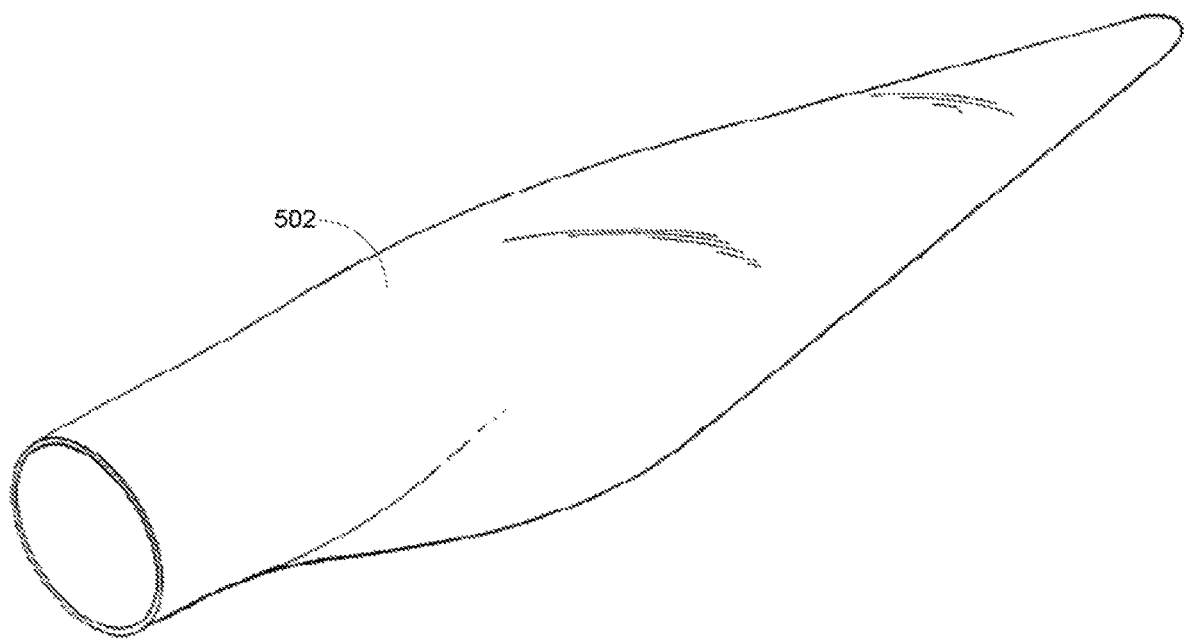
FIG. 5 shows exemplary fiber-reinforced articles made by the present methods.

FIG. 5 shows an exemplary fiber-reinforced composite wind turbine blade 502 formed by the present prepregs. The blade 502 is one of many types of articles that can be formed by the present prepregs. Other articles may include vehicle parts (e.g., aircraft parts, automotive parts, etc.), appliance parts, containers, etc.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the electrode" includes reference to one or more electrodes and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method of making a prepreg, the method comprising:
 providing a plurality of fibers consisting of glass fibers;
 contacting the glass fibers with a blocked isocyanate coupling compound to make treated glass fibers; and
 assembling the treated glass fibers into a treated glass fiber substrate;
 contacting the treated glass fiber substrate with a thermoplastic polymer to form a glass-fiber-polymer combination;
 heating the glass-fiber-polymer combination to a deblocking temperature for the blocked isocyanate coupling compound, wherein the heating transforms the blocked isocyanate coupling compound into an unblocked isocyanate compound; and covalently bonding the thermoplastic polymer to the treated glass fibers, wherein the covalent bonding consists of a reaction between the unblocked isocyanate compound and the thermoplastic polymer.

2. The method of claim 1, wherein the thermoplastic polymer comprises a solid thermoplastic polymer comprising at least one of (i) a thermoplastic polymer film or (ii) thermoplastic polymer particles.

3. The method of claim 2, wherein the solid thermoplastic polymer comprises the thermoplastic polymer particles, and wherein the treated glass fiber substrate is contacted with a mixture of the thermoplastic polymer particles in a liquid medium.

4. The method of claim 3, wherein the liquid medium comprises water.

5. The method of claim 3, wherein the liquid medium is removed from the glass-fiber-polymer combination.

6. The method of claim 1, wherein the thermoplastic polymer comprises a polyamide polymer.

7. The method of claim 6, wherein the polyamide polymer comprises nylon-6.

8. The method of claim 1, wherein the thermoplastic polymer lacks any unreacted monomers.

9. The method of claim 1, wherein the blocked isocyanate compound comprises tris(3-trimethoxysilylpropyl) isocyanurate.

10. A prepreg comprising:
a treated glass-fiber substrate covalently bound to a thermoplastic polymer,
wherein the treated glass-fiber substrate is formed from:
a plurality of fibers, and
a blocked isocyanate coupling compound coupled to the plurality of fibers,
wherein the plurality of fibers consists of glass fibers; and
wherein the thermoplastic polymer is formed from at least one of (i) a solid polymer film, or (ii) solid polymer particles, and
wherein the thermoplastic polymer is covalently bonded to the treated glass-fiber substrate through covalent bonding consisting of a reaction between an unblocked isocyanate compound generated from the blocked isocyanate coupling compound and the thermoplastic polymer.

11. The prepreg of claim 10, wherein the treated glass-fiber substrate comprises a woven fabric.

12. The prepreg of claim 10, wherein the thermoplastic polymer comprises a polyamide polymer.

13. The prepreg of claim 12, wherein the polyamide polymer comprises nylon-6.

14. The prepreg of claim 10, wherein the unblocked isocyanate compound comprises tris(3-trimethoxysilylpropyl) isocyanurate.

15. A fiber-containing composite formed from one or more prepregs, wherein the prepregs are formed by:
providing a plurality of fibers consisting of glass fibers;
contacting the glass fibers with a blocked isocyanate coupling compound to make treated glass fibers; and
assembling the treated glass fibers into a treated glass fiber substrate;
contacting the treated glass fiber substrate with a thermoplastic polymer to form a glass-fiber-polymer combination;
heating the glass-fiber-polymer combination to a deblocking temperature for the blocked isocyanate coupling compound, wherein the heating transforms the blocked isocyanate coupling compound into an unblocked isocyanate compound; and
covalently bonding the thermoplastic polymer to the treated glass fibers, wherein the covalent bonding consists of a reaction between the unblocked isocyanate compound and the thermoplastic polymer.

16. The fiber-containing composite of claim 15, wherein the thermoplastic polymer comprises a solid thermoplastic polymer comprising at least one of (i) a thermoplastic polymer film or (ii) thermoplastic polymer particles.

17. The fiber-containing composite of claim 15, wherein the thermoplastic polymer comprises a polyamide polymer.

18. The fiber-containing composite of claim 17, wherein the polyamide polymer comprises nylon-6.

19. The fiber-containing composite of claim 15, wherein the thermoplastic polymer lacks any unreacted monomers.

20. The fiber-containing composite of claim 15, wherein the blocked isocyanate compound comprises tris(3-trimethoxysilylpropyl) isocyanurate.

* * * * *